United States Patent Office 3,435,459
Patented Mar. 25, 1969

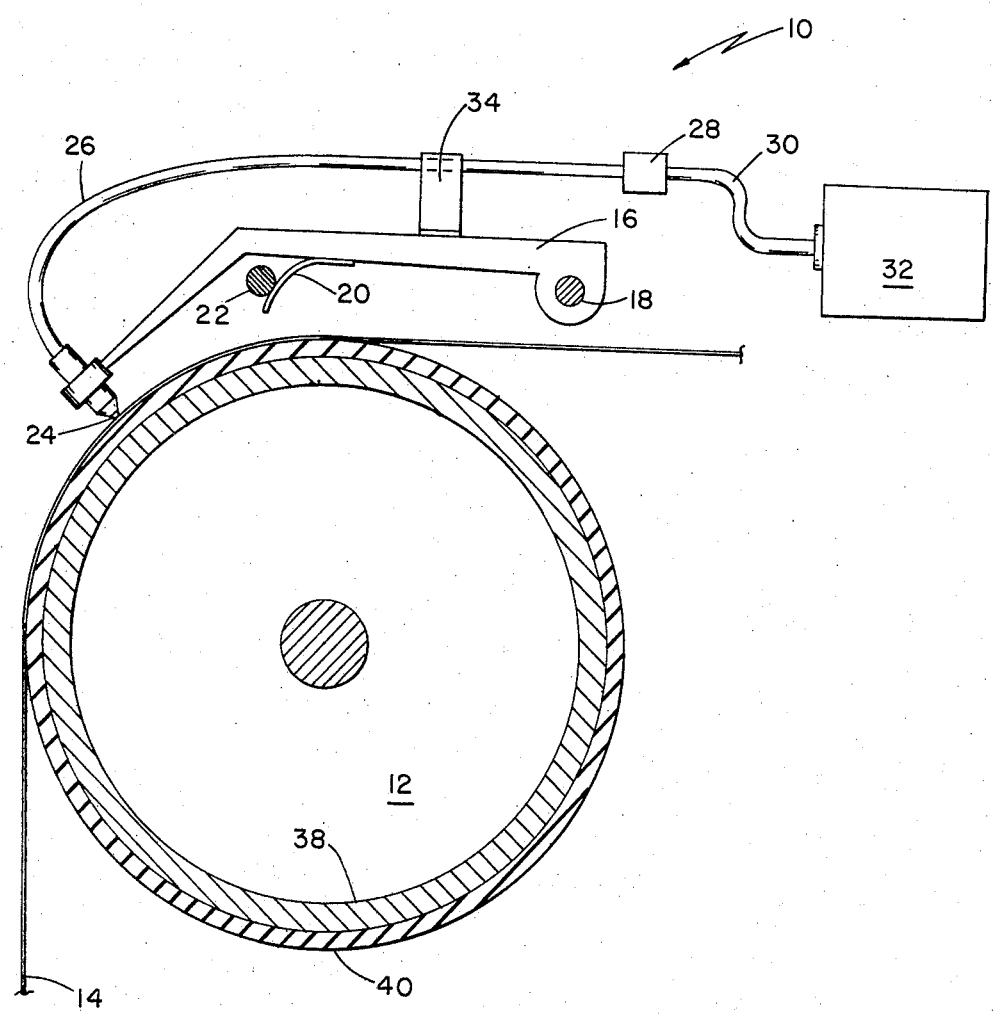

3,435,459
RECORDER USING PRESSURIZED BALLPOINT PEN
Joseph Peter De Nicola, Hingham, Mass., assignor to Instron Corporation, Canton, Mass., a corporation of Massachusetts
Filed Nov. 16, 1966, Ser. No. 594,769
Int. Cl. G01d 15/16
U.S. Cl. 346—140                             1 Claim

ABSTRACT OF THE DISCLOSURE

In a chart recorder, a roller having elastomeric material at its periphery and ballpoint pen having the ink therein at a pressure in excess of atmospheric biased against the roller periphery.

---

This invention relates to laying down ink traces on charts at high speed.

The primary object of the invention is to provide for such high-speed tracing without skipping. Other objects are to accomplish this with simplicity, reliability, and low expense, and without leakage of ink at lower speeds.

The invention features, in chart recorders, a pressurized ballpoint pen biased toward an elastomeric surface. In preferred embodiments, the ink in the pen is maintained at a pressure in the range of one-half p.s.i. to two p.s.i., the elastomeric material of the surface is of durometer in the range of seventy to ninety, and the elastomeric material is a gamma-radiated, cross-linked, flexible, thermally stable polyolefin.

Other objects, features, and advantages will appear from the following description of a preferred embodiment of the invention, taken together with the attached drawing, which shows a diagrammatic view of a preferred embodiment of the invention.

The drawing shows a pen assembly (indicated generally at 10), a roll 12, and paper 14 moving over the roll.

The pen assembly 10 includes a pen carriage 16 mounted for slidable movement on shaft 18, which extends across a chart recorder (not shown). The lower surfaces of carriage 16 bears spring 20 which presses against shaft 22 (also extending across the chart recorder) to bias the tip 24 of standard ballpoint pen cartridge 26, secured in carriage 16, against paper 14 with a force of 250 grams.

The cartridge 26 is joined by connector 28 to flexible tube 30 long enough to permit full travel across the recorder of the pen cartridge 26, and in turn connected to a small aquarium pump 32 delivering a pressure of 1½ p.s.i. therethrough against the ink in the cartridge 26. The flexible cartridge 26 is secured on the carriage 16 by means of clip 34 and through a hole in the carriage through which the ballpoint tip 24 and the portion of the cartridge 26 adjacent it extend.

The roll 12 has a metal cylindrical core 38 around which is an annular sheath 40, 0.020 inch in thickness, of gamma-radiated, cross-linked, flexible, thermally stable polyolefin, 74 in durometer, secured around the core 38 by heating above 250° F.

In operation, the relatively soft layer 40 cooperates with the ball point 24 of the cartridge 26 to lay down on paper 14 an excellent trace at very high pen speeds, with great and much improved freedom from skipping.

What is claimed is:
1. In a chart recorder, in combination, a roll and a ballpoint pen, said roll being around its periphery of elastomeric gamma-radiated, cross-linked, flexible, thermally stable polyolefin material, ink in said ballpoint pen being at a pressure in the range of ½ to 2 p.s.i., and said pen being biased against said periphery.

References Cited

UNITED STATES PATENTS

| 2,835,549 | 5/1958 | Murdoch et al. | 346—32 |
| 1,951,057 | 3/1934 | Leitch | 120—46 |
| 2,484,298 | 10/1949 | Krahulec | 346—140 |
| 3,054,109 | 9/1962 | Brown | 346—140 |
| 3,149,902 | 9/1964 | Dransfield | 346—105 |

JOSEPH W. HARTARY, *Primary Examiner.*

RICHARD B. WILKINSON, *Assistant Examiner.*

U.S. Cl. X.R.
346—140